Patented Jan. 8, 1946

2,392,412

UNITED STATES PATENT OFFICE 2,392,412

COMPOSITION FOR LINING THE SEAMS OF SHEET METAL CONTAINERS

John E. Robinson, Glen Ellyn, and Paul W. Millelot, Jr., Maywood, Ill., assignors to American Can Company, New York, N. Y., a corporation of New Jersey No Drawing. Application July 2, 1941, Serial No. 400,867

3 Claims. (Cl. 260—32)

The present invention relates to compounds for lining can ends and the like which are used in containers for holding methyl alcohol, ethyl alcohol, polyhydric alcohol and mixtures such as are used for anti-freezing liquids in the cooling system of automobile engines and the like and has for its object broadly the provision of a compound lining material which will not be dissolved or disturbed by such anti-freeze liquid contents but will provide for fully hermetic sealing in the seams between the can body and its bottom and top ends.

Anti-freeze liquids of this general nature which have contained small amounts of vegetable and mineral oils are exceedingly hard to hold in metal containers by reason of the highly penetrating effect certain ingredients such as the oils even in small quantities which are in the anti-freeze mixtures, naturally have on rubber or similar substances which have been largely used for gaskets in the double seams.

In this invention an improved lining compound is made by mixing vinylite copolymer with certain solvents, plasticizers and pigment fillers so that a gasket lining material is produced which can be used satisfactorily in the end seam joints of metal cans for such products as anti-freezing liquids. The gasket material being liquid when produced can be flowed into can end grooves by conventional gasket compound lining machines and can be set or dried by usual methods. Such lined ends thereupon are united to the can bodies in the standard double seamed joints so largely used in can manufacture.

Numerous other objects and advantages of the invention will be apparent as it is better understood from the following description which is of a preferred embodiment thereof.

The procedure required in producing such an improved gasket lining mixture comprises the thorough mixing together of certain proportions of the ingredients and in definite sequence in order to provide the desired dissolving and plasticizing actions.

A workable and preferable formula is given as an example, the relative quantities are variable to some extent to adapt the final mixture to desired lining conditions.

| | Pounds |
|---|---|
| Copolymer of vinyl acetate and vinyl chloride | 70 |
| Chlorinated diphenyl | 35 |
| Santicizer #B16 (butyl phthalyl butyl glycollate) | 35 |
| Titanium dioxid | 4.25 |
| Xylol | 142 |
| Methyl isobutyl ketone | 114 |
| Methyl ethyl ketone | 28 |

The best procedure is to pour the xylol, the methyl isobutyl ketone and the methyl ethyl ketone in a suitable mixing tank and then to add the vinyl acetate and vinyl chloride copolymer slowly while stirring until it is in complete solution. To this solution the chlorinated diphenyl and the butyl phthalyl butyl glycollate then are added while maintaining constant agitation and until they are dissolved completely. The chlorinated diphenyl and the butyl phthalyl butyl glycollate are plasticizers and increase adhesion in the final lining compound.

After this copolymer mixture has been properly treated the pigment filler, that is the titanium dioxid, slowly is added in order to provide the proper color. This coloring is of value in later visual inspection of the can ends which are lined by the compound.

The desired viscosity for the final lining compound is obtained at this stage of the procedure by introducing more solvent if a thinner consistency is desired or by evaporating some of the solvent if a thicker consistency is wanted. Obviously, if the lining is to be performed by means of a nozzle type of compound liner, the final liner compound must be thin enough to permit free flowing through the nozzle. If the compound is applied as in the printing or die lining manner, more solids may be used.

It will be evident, from the foregoing, that the first necessary step in the procedure is to thoroughly mix the copolymer of vinyl acetate and vinyl chloride with the suitable solvents so that, the material can be properly handled. Following this step the mixture is subjected to the proper plasticizers and pigments after which the desired viscosity is obtained for the final mixture.

While the procedure given above in the present example provides for an efficient preparation of the lining compound, it will be understood that this exact procedure need not be followed as good results may be obtained by first mixing together the copolymer of vinyl acetate and vinyl chloride with the plasticizer butyl phthalyl butyl glycollate. A variation of this procedure would be, first mixing the copolymer of vinyl acetate and vinyl chloride with both the chlorinated diphenyl and the butyl phthalyl butyl glycollate. Another variation which might be used under certain circumstances consists in mixing together the copolymer of vinyl acetate and vinyl chloride with the butyl phthalyl butyl glycollate and with the titanium dioxid filler. Irrespective of the exact procedure, the quantities given above will produce a lining compound suitable for use in a nozzle type of lining machine.

The material thus obtained is adaptable for usual lining procedure in the closing of can seams and by reason of the resistance against penetration of certain of the contents of the cans, this lining material is particularly adapted for gasket lining the joints in cans used in holding polyhydric alcohol, methyl and ethyl alcohols, and similar mixtures which are so largely used in anti-freezing liquids.

It is thought that the invention and many of its attendant advantages will be understood from the foregoing description, and it will be apparent that various changes may be made in the matter of the ingredients, their identity and their proportions without departing from the spirit and scope of the invention or sacrificing all of its material advantages, the form hereinbefore described being merely a preferred embodiment thereof.

We claim:

1. A gasket lining composition for lining the seams of sheet metal containers for anti-freeze liquids and the like, comprising the following mixture in approximately the following proportions by weight: 70 pounds of a copolymer of vinyl acetate and vinyl chloride, 35 pounds of chlorinated diphenyl, 35 pounds of butyl phthalyl butyl glycollate, 284 pounds of a suitable solvent mixture and 4.25 pounds of a filling and coloring material, said composition being further characterized by providing an hermetic seal for said anti-freeze liquid containing highly penetrating ingredients.

2. A gasket lining composition for lining the seams of sheet metal containers for anti-freeze liquids and the like, comprising the following mixture in approximately the following proportions by weight: 70 pounds of a copolymer of vinyl acetate and vinyl chloride, 35 pounds of chlorinated diphenyl, 35 pounds of butyl phthalyl butyl glycollate, 4.25 pounds of titanium dioxide, 142 pounds of xylol, 114 pounds of methyl isobutyl ketone and 28 pounds of methyl ethyl ketone, said composition being further characterized by providing an hermetic seal for said anti-freeze liquid containing highly penetrating ingredients.

3. A gasket lining composition for lining the seams of sheet metal containers for anti-freeze liquids and the like, comprising the following mixture: a resinous material consisting of a copolymer of vinyl acetate and vinyl chloride, together with a substantially equal weight of a mixture of substantially equal parts of chlorinated diphenyl and butyl phthalyl butyl glycollate as a plasticizer, a compatible solvent, and a filling and coloring material, said composition being further characterized by providing an hermetic seal for liquids containing highly penetrating ingredients.

JOHN E. ROBINSON.
PAUL W. MILLELOT, Jr.